(12) United States Patent
Kawahara et al.

(10) Patent No.: US 9,104,949 B2
(45) Date of Patent: Aug. 11, 2015

(54) CARD AND CARD MANUFACTURING METHOD

(75) Inventors: Kiyoaki Kawahara, Ibaraki (JP); Jintaro Tatsu, Ibaraki (JP)

(73) Assignee: DAI NIPPON PRINTING CO., LTD, Tokyo (JP)

( * ) Notice: Subject to any disclaimer, the term of this patent is extended or adjusted under 35 U.S.C. 154(b) by 0 days.

(21) Appl. No.: 14/240,464

(22) PCT Filed: Aug. 23, 2012

(86) PCT No.: PCT/JP2012/071269
§ 371 (c)(1),
(2), (4) Date: May 19, 2014

(87) PCT Pub. No.: WO2013/027789
PCT Pub. Date: Feb. 28, 2013

(65) Prior Publication Data
US 2014/0299666 A1   Oct. 9, 2014

(30) Foreign Application Priority Data

Aug. 25, 2011   (JP) ................................. 2011-183717

(51) Int. Cl.
*G06K 19/02*   (2006.01)
*G06K 19/077*   (2006.01)
(Continued)

(52) U.S. Cl.
CPC .......... *G06K 19/07722* (2013.01); *B42D 25/00* (2014.10); *G06K 19/07703* (2013.01); *G06K 19/07707* (2013.01); *G06K 19/07709* (2013.01);
(Continued)

(58) Field of Classification Search
CPC .............. G02F 1/133553; G02F 1/167; G02F 2001/133374; G06K 19/07703
USPC .................................................. 235/488, 492
See application file for complete search history.

(56) References Cited

U.S. PATENT DOCUMENTS

2010/0026943 A1*  2/2010  Jagt et al. ...................... 349/115
2012/0216947 A1   8/2012  Huber et al.

FOREIGN PATENT DOCUMENTS

| DE | 102009053498 A1 | 5/2011 |
| EP | 1168238 A1 | 1/2002 |

(Continued)

OTHER PUBLICATIONS

International Search Report of PCT/JP2012/071269.
(Continued)

*Primary Examiner* — Seung Lee
(74) *Attorney, Agent, or Firm* — Locke Lord LLP; Jeffrey D. Hsi

(57) ABSTRACT

Provided are a card and card manufacturing method that enable clear visual recognition of a display in a display portion even if the card surface has been provided with a matte finish, and enable an improvement in texture related to position drift between a display device and a window portion, as well as an improvement in workability during manufacture. The card (1) has: a display portion (10); an electronic component that controls a display to the display portion (10); a surface layer (20) placed as the topmost layer of the card (1) and formed from a clear material; a mirror-surface portion (21) provided on a portion that overlaps the display portion (10); and a matte portion (22) provided on a portion outside the mirror-surface portion (21), said matte portion (22) having a coarser grain than the mirror-surface portion (21).

8 Claims, 5 Drawing Sheets

(51) Int. Cl.
  *B42D 25/00* (2014.01)
  *B29C 59/02* (2006.01)
(52) U.S. Cl.
  CPC ....... *B29C 2059/023* (2013.01); *B42D 2033/04* (2013.01); *B42D 2033/46* (2013.01); *Y10T 29/49002* (2015.01)

(56) References Cited

FOREIGN PATENT DOCUMENTS

| | | | |
|---|---|---|---|
| JP | S62-26568 A | 2/1987 |
| JP | H04195487 A | 7/1992 |
| JP | H07101186 A | 4/1995 |
| JP | H07314958 A | 12/1995 |
| JP | H09267567 A | 10/1997 |
| JP | H09277761 A | 10/1997 |
| JP | 2001134731 A | 5/2001 |
| JP | 2008071244 A | 3/2008 |
| JP | 2011013814 A | 1/2011 |

OTHER PUBLICATIONS

Extended European Search Report for EP12825451.3 dated Mar. 3, 2015.

\* cited by examiner

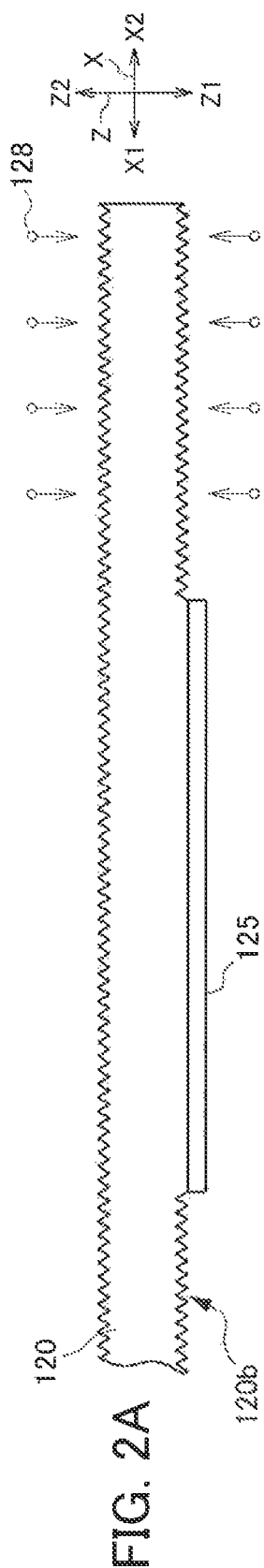
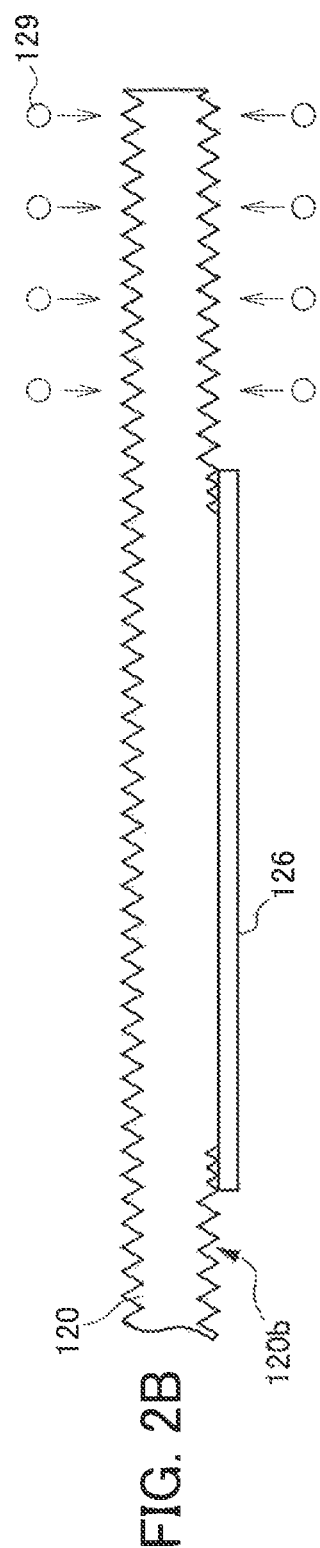
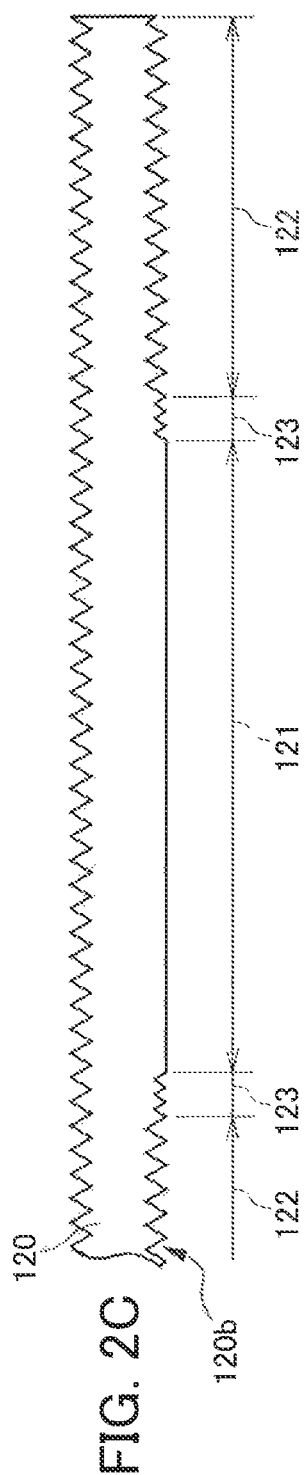
FIG. 2A
FIG. 2B
FIG. 2C

CARD AND CARD MANUFACTURING METHOD

CROSS-REFERENCE TO RELATED APPLICATIONS

This application is the national phase under 35 U.S.C. §371 of PCT International Application No. PCT/JP2012/071269, filed Aug. 23, 2012, which claims the benefit of Japanese Patent Application No. 2011-183717, filed Aug. 25, 2011, the entire contents of the aforementioned applications are hereby incorporated herein by reference.

TECHNICAL FIELD

The present invention relates to a card embedded with a display device and a card manufacturing method.

BACKGROUND ART

Hitherto, there is known a matted card that is formed by performing a physical surface roughing process such as blasting thereon (for example, see Patent Document 1).

When the matted card is equipped with the display device, the display content becomes unclear due to the matte finish. However, there is a case in which the matte finish is needed due to the advantage that the damage in appearance is not easily and conspicuously noticed compared to the polishing for flattening and smoothening the card surface.

Furthermore, in the card including the display device, a window portion through which the display device is visually recognized needs to be provided on the card surface. However, the position drift between the display device and the window portion is conspicuous. For this reason, the card including the display device needs to have the position drift allowance reduced, and hence the manufacturing workability is poor.

[Patent Document 1] Japanese Unexamined Patent Application, Publication No. 2008-71244

DISCLOSURE OF THE INVENTION

Problems to be Solved by the Invention

An object of the present invention Is to provide a card in which the display of the display portion is clearly and visually recognized even when a matte finish is applied to the card surface, to improve texture related to the position drift between the display device and the window portion, and improve manufacturing workability and to provide a card manufacturing method.

Means for Solving the Problems

The present invention solves the above-described problems by using the following solutions. Furthermore, the reference numerals corresponding to those of the embodiment of the present invention are given in order to help understanding, but the present invention is not limited thereto. Furthermore, the constituents indicated by the reference numerals may be appropriately improved, and at least some of these constituents may be replaced with the other constituents.

A first aspect provides a card including: a display portion (10); electronic components (3, 4) that display a display on the display portion; and a surface layer (20) that is disposed on a topmost layer of the card and is formed of a clear material, wherein when a front surface (1a) of the card is viewed from the normal direction, the surface layer includes a mirror-surface portion (21) that is provided in a portion overlapping the display portion and a matte portion (22) that is provided in a portion outside the mirror-surface portion and has a coarser grain than that of the mirror-surface portion.

A second aspect provides the card according to the first aspect, wherein the surface layer also includes a transition portion (23) that is provided in the range located in the entire outer circumference of the mirror-surface portion (21) and inside the matte portion (22), has a coarser grain than that of the mirror-surface portion, and has a finer grain than that of the matte portion when the front surface of the card is viewed from the normal direction.

A third aspect provides the card according to the first or second aspect, wherein the electronic components include a button (5) that is operable by a user and displays information on the display portion (10) in response to this operation.

A fourth aspect provides a method of manufacturing the card according to any one of the first to third aspects, including: a surface layer manufacturing step of manufacturing the surface layer (20) with the mirror-surface portion (21) and the matte portion (22) by pressing a mold (120), including a mirror-surface portion corresponding portion (121) and a matte portion corresponding portion (122) provided in a portion outside the mirror-surface portion corresponding portion and having a coarser grain than that of the mirror-surface portion corresponding portion, against a sheet member (20A); a display portion disposing step of disposing the display portion onto a card substrate (2); and a laminating step of laminating the surface layer manufactured by the surface layer manufacturing step onto the card substrate disposed by the display portion disposing step while the mirror-surface portion and the display portion are positioned.

A fifth aspect provides the method of manufacturing the card according to the fourth aspect, wherein the mold (120) includes a transition portion corresponding portion (123) that is provided in a range located in the entire outer circumference of the mirror-surface portion corresponding portion (121) and inside the matte portion corresponding portion (122), has a coarser grain than that of the mirror-surface portion corresponding portion, and has a finer grain than that of the matte portion corresponding portion, and wherein in the surface layer manufacturing step, the mold is pressed against the sheet member (20A) so as to form the transition portion (23) that is provided in the range located in the entire outer circumference of the mirror-surface portion and inside the matte portion (22), has a coarser grain than that of the mirror-surface portion (21), and has a finer grain than that of the matte portion.

Effects of the Invention

According to the present invention, the following effect may be obtained.

In the first aspect, since the mirror-surface portion is provided in a portion overlapping the display portion, the display of the display portion may be clearly and visually recognized. Meanwhile, since the matte portion is provided in a portion outside the mirror-surface portion, scratches on the card surface may be made inconspicuous, and hence the texture may be improved.

In the second aspect, since the transition portion is provided in the range located in the entire outer circumference of the mirror-surface portion and inside the matte portion, has a coarser grain than that of the mirror-surface portion, and has a finer grain than that of the matte portion, the boundary between the mirror-surface portion and the matte portion may be made unclear (obscure), and hence the visual texture may be improved.

Furthermore, since the transition portion is provided, the position drift between the display portion and the mirror-surface portion as the window portion used to visually recognize the display portion is not conspicuous, and hence the texture may be improved. Furthermore, since the position drift allowance between the mirror-surface portion and the display portion may be largely alleviated during the manufacturing process, the workability may be improved.

In the third aspect, since there is provided the button that displays information on the display portion, information may be displayed in response to the operation of the user.

In the fourth aspect, since the sheet member including the mirror-surface portion and the matte portion is manufactured by pressing the die against the sheet member in the sheet member manufacturing step and the sheet member is laminated on the card substrate while being positioned thereto in the sheet member laminating step, it is possible to suppress damage to the component inside the card. That is, if the mirror-surface portion and the matte portion are provided simultaneously when the sheet member is laminated on the substrate as not in the case of the present invention, there is the possibility that the component inside the card may be damaged due to the pressure caused by the pressing. On the contrary, in the present invention, since the mirror-surface portion and the matte portion are provided in the sheet member in the sheet member laminating step and the sheet member is laminated on the card substrate, the pressure applied to the component inside the card may be decreased, and hence damage thereof may be suppressed.

Furthermore, when the mirror-surface portion is provided in, for example, an area provided with an identification photo or the like, the identification photo or the like may be clearly and visually recognized. Moreover, when the mirror-surface portion is provided in, for example, an area where a hologram label or the like adheres, the air biting caused when the hologram label or the like adheres may be prevented, and hence the workability may be improved.

In the fifth aspect, since the transition portion is provided, the same effect as that of the second aspect may be obtained.

BRIEF DESCRIPTION OF THE DRAWINGS

FIG. 2A to FIG. 2C are each a cross-sectional view illustrating a method of manufacturing an upper plate 120 of a die that forms a surface layer 20 of the embodiment.

Figure 1A:
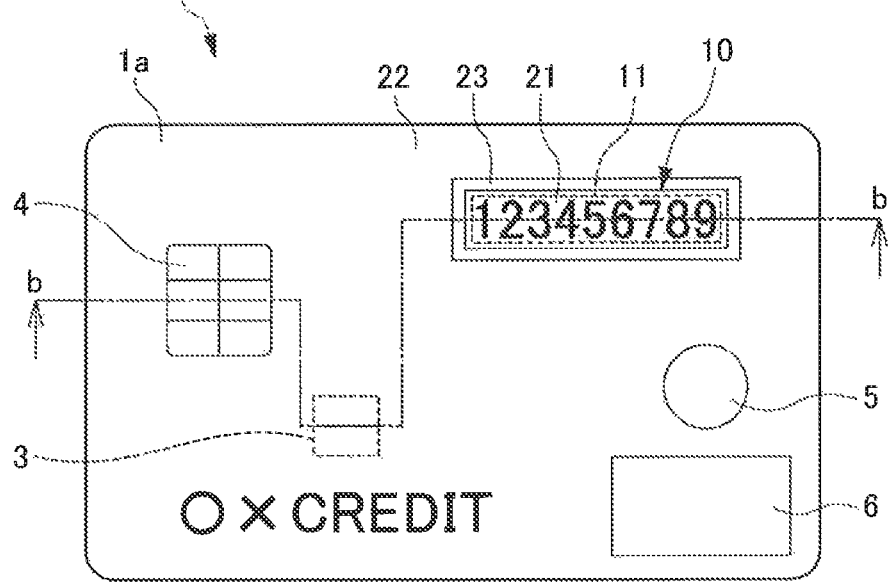
FIG. 1A is a top view and FIG. 1B is a cross-sectional view of a card 1 of the embodiment.

EXPLANATION OF REFERENCE NUMERALS 1 card
2 card substrate
3 IC chip
5 switch
10 display portion
20 surface layer
21 mirror-surface portion
22 matte portion
23 transition portion
120 upper plate
121 mirror-surface portion corresponding portion
122 matte portion corresponding portion
123 transition portion corresponding portion

PREFERRED MODE FOR CARRYING OUT THE INVENTION

Embodiment

Hereinafter, an embodiment of the present invention will be described with reference to the drawings.

FIG. 1 is a top view and a cross-sectional view of a card 1 of the embodiment.

FIG. 1A is a top view of the card 1 (a view illustrating a card surface 1a when viewed in the normal direction).

Figure 1B:
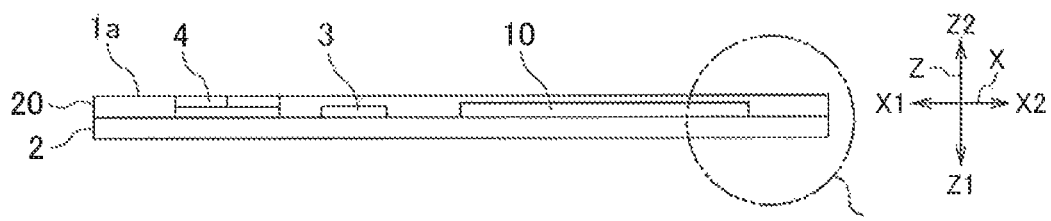

FIG. 1B is a cross-sectional view of the card 1 (a cross-sectional view taken along b-b of FIG. 1).

Figure 1C:
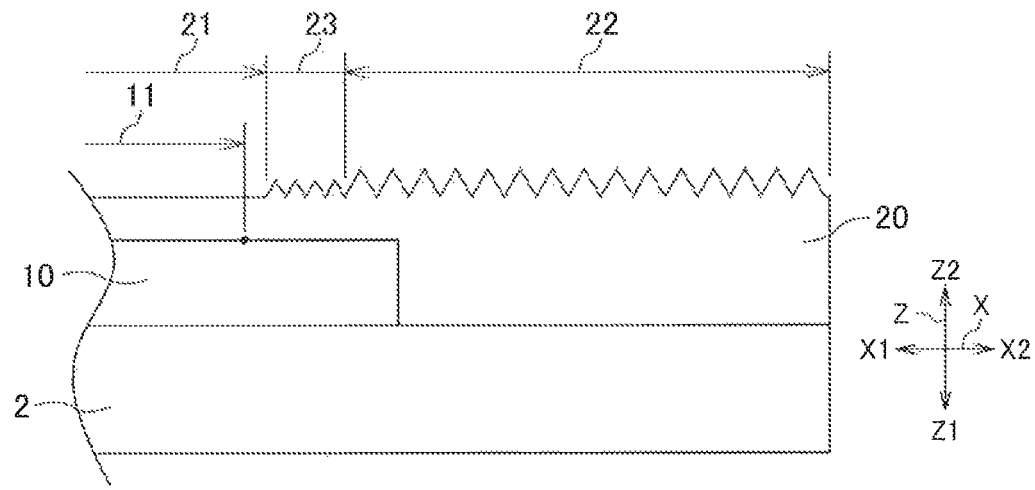
FIG. 1C is an enlarged cross-sectional view showing a part C of FIG. 1B.

FIG. 1C is an enlarged view of a part within a circle c indicated by the two-dotted chain line of FIG. 1B.

The card 1 is an IC card that is used in, for example, a credit card. The card 1 displays a password (a number) on a display portion 10 in response to the operation of a switch 5 by a user. The password is input to a terminal such as a reader/writer by the user in the case of payment made using the card 1.

The card 1 includes a card substrate 2, an IC chip 3, an external contact terminal 4, a switch 5, a hologram label 6, a display portion 10, and a surface layer 20.

Furthermore, the card 1 includes a non-contact communication coil antenna, a magnetic stripe, and the like other than the above-described configurations. The detailed description thereof will be omitted.

The card substrate 2 is the base member of the card 1. The card substrate 2 is formed of a resinous sheet material such as PET (polyethylene terephthalate), PET-G, and PVC (polyvinyl chloride). The IC chip 3, the external contact terminal 4, the switch 5, and the display portion 10 are disposed on the card substrate 2. Furthermore, in the embodiment, an example will be described in which a lamination structure is provided on the upside Z2 of the card substrate 2, but a lamination structure may be also provided on the downside Z1 of the card substrate 2 if necessary.

The IC chip 3 includes a CPU (central processing unit) or a storage unit (not illustrated). The storage unit stores a program and information necessary for the operation of the IC chip 3 or includes a temporary storage region for the process. The IC chip 3 receives driving power from a battery (not illustrated) provided inside the card. The IC chip 3 is electrically connected to the switch 5 and the display portion 10.

The IC chip 3 obtains a random password by performing a random number calculation in response to the operation of the switch 5. The IC chip 3 displays the password on the display portion 10. In this way, the IC chip 3 and the switch 5 control the display on the display portion 10.

The external contact terminal 4 is a contact terminal that exchanges information with the reader/writer via communication while in contact with the contact terminal of the reader/writer. The external, contact terminal 4 is exposed to the card surface 1a. The external contact terminal 4 is electrically connected to an IC chip (not illustrated).

The IC chip is a control unit that generally controls the card 1. The IC chip includes a CPU or a storage unit. The IC chip exchanges information with a reader/writer (not illustrated) as an external unit via, for example, the external contact terminal 4 or the coil antenna (not illustrated).

The switch 5 is a push button that may be operated by the user. The switch 5 includes an electric contact point, and outputs operation information to the IC chip 3 in response to an operation.

The hologram label 6 is a label that is attached for preventing counterfeiting of the card 1. The hologram label 6 is attached onto the surface layer 20.

The display portion 10 is a thin display device such as electronic paper. As indicated by the dashed line of FIG. 1A, the display portion 10 includes a rectangular display area 11 that displays a password in a top view.

The surface layer 20 is disposed as the topmost layer of the IC card 1, and is formed of a clear material.

The front surface or the rear surface of the surface layer 20 is provided with a print layer.

In a top view, the surface layer 20 includes a mirror-surface portion 21, a matte portion 22, and a transition portion 23.

The mirror-surface portion 21 is provided in a portion overlapping the display portion 10. The mirror-surface portion 21 is finished as a mirror-surface that essentially has no uneven portions. The average roughness (Ra) of the mirror-surface portion 21 is, for example, 0.1 μm (which is the same in the following description) or less.

A portion provided with the mirror-surface portion 21 in the surface layer 20 is not colored by printing between the front and rear surfaces. The mirror-surface portion 21 is disposed at the outside of the display area 11 for the password of the display portion 10. For this reason, the password displayed on the display portion 10 may be visually recognized at the mirror-surface portion 21.

The matte portion 22 is provided on the entire surface of the surface layer 20 outside of the mirror-surface portion 21. The matte portion 22 is finished in a matte shape, the surface of which has a larger amount of unevenness and is rougher than the mirror-surface portion 21. The average roughness (Ra) of the matte portion 22 is, for example, about 0.7 to 1.0.

A design, a card company name, and the like are printed on the entire surface of the matte portion 22. For this reason, the matte portion 22 may hide the configuration inside the card 1.

The transition portion 23 is formed in a frame shape in a range located on the entire outer circumference of the mirror-surface portion 21 and inside the matte portion 22. The transition portion 23 has a coarser grain and is rougher than the mirror-surface portion 21, and has a finer grain than that of the matte portion 22. The average roughness (Ra) of the transition portion 23 is, for example, about 0.2 to 0.3.

That is, the average roughness (Ra of 0.1 or less) of the mirror-surface portion 21 is a half or less of the average roughness (Ra of 0.7 to 1.0) of the peripheral matte portion 22 and the average roughness (Ra of 0.2 to 0.3) of the transition portion 23.

The transition portion 23 is printed in a frame shape. For this reason, the transition portion 23 may hide the configuration inside the card 1.

Furthermore, the transition portion 23 is disposed so as to overlap the display portion 10, and is disposed outside of the display area 11 for the password of the display portion 10. For this reason, the transition portion 23 does not hide the password of the display portion 10.

Next, a method of looking at the card 1 when the card surface 1a is observed from the upside Z2 will be described.
(Mirror-Surface Portion 21)

As described above, the password displayed on the display portion 10 may be visually recognized from the mirror-surface portion 21. Furthermore, since the mirror-surface portion 21 has a mirror surface, the random reflection of light may be prevented, and the password may be clearly and visually recognized without blurring the password.
(Matte Portion 22)

Since the matte portion 22 has a rough surface, the degree of gloss is low and scratches on the card surface 1a may be made inconspicuous. For this reason, the matte portion 22 may improve the texture of the card 1. Furthermore, since the matte portion 22 is provided with the print layer as described above, the configuration inside the card 1 may be hidden.
(Transition Portion 23)

As described above, the transition portion 23 does not hide the password shown at the display portion 10. When the glossy mirror-surface portion 21 abruptly changes to the unglossy matte portion 22, the boundary line is obviously seen, and hence the texture degrades. However, the transition portion 23 may improve the texture of the card 1 by forming an unclear boundary between the mirror-surface portion 21 and the matte portion 22. That is, the transition portion 23 may be used so that the gloss gradually disappears by suppressing such an abrupt change.

Furthermore, even when there is a position drift (a position drift in the longitudinal direction, a position drift in the lateral direction, and a position drift in the rotation direction) between the display portion 10 and the mirror-surface portion 21 that becomes the window portion used to visually recognize the display portion 10, the position drift may not be visually recognized, and hence the texture may be improved. When the width of the transition portion 23 is set to about 1 mm in case of the size of the credit card, for example, a position drift of about 1 mm may be allowed in the configuration ratio illustrated in FIG. 1.

A method of manufacturing the upper plate 120 of the pressing die for forming the front surface of the surface layer 20 will be described.

FIG. 2 is a cross-sectional view illustrating a method of manufacturing the upper plate 120 of the die for forming the surface layer 20 of the embodiment.

Figure 3A:
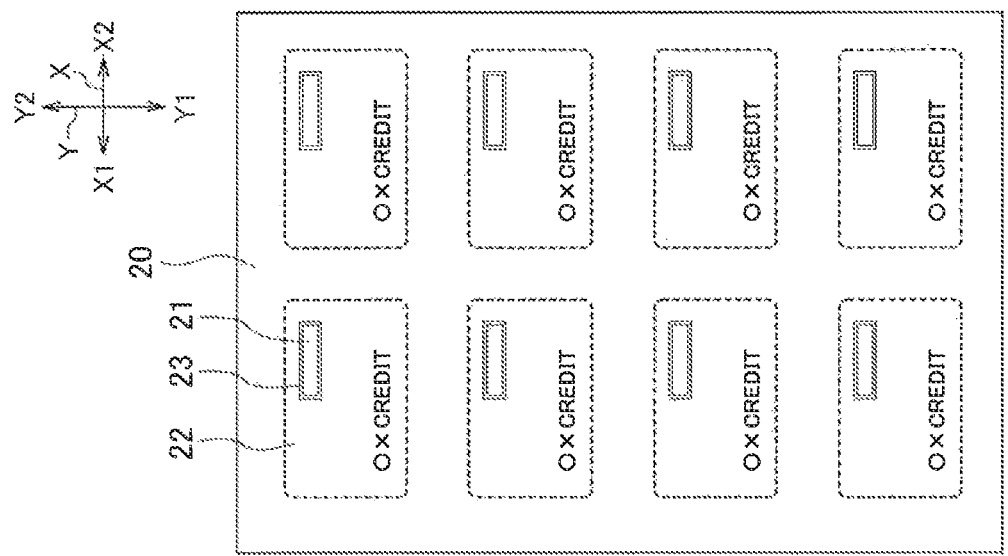
FIG. 3A is a view illustrating the upper plate 120 of the die of the embodiment when viewed from the rear surface thereof and FIG. 3B is a view illustrating the manufactured surface layer 20 when viewed from the front surface thereof.
Figure 3B:
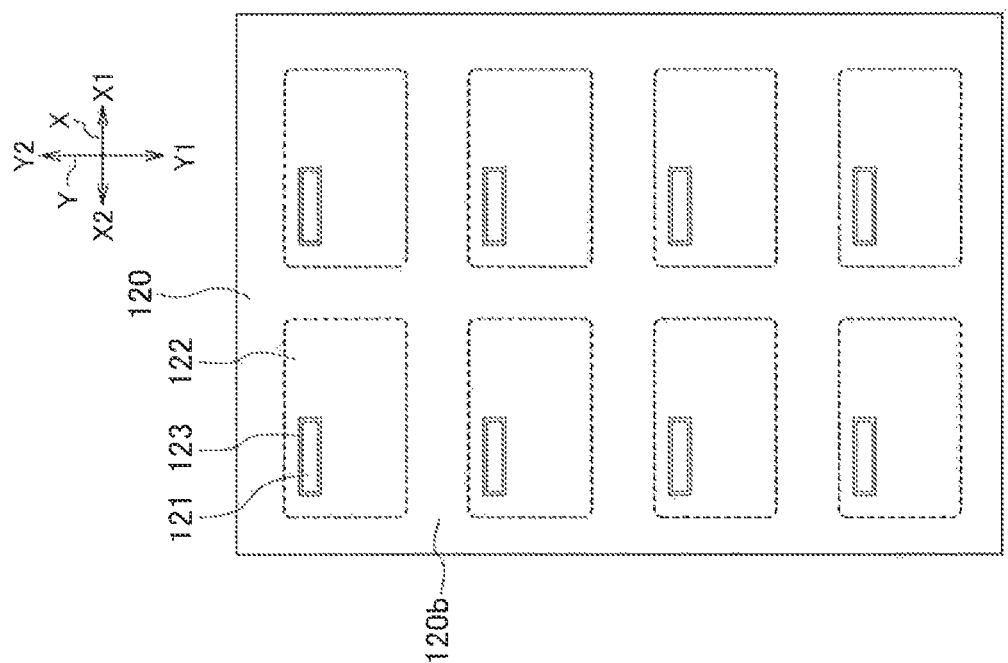

FIG. 3 is a view (FIG. 3A) illustrating the upper plate 120 of the die of the embodiment when viewed from the rear surface thereof and is a view (FIG. 3B) illustrating the manufactured surface layer 20 when viewed from the front surface thereof.

The die manufacturing process is performed according to the following procedure.

(1) As illustrated in FIG. 2A, a masking tape 125 adheres to a range corresponding to the mirror-surface portion 21 in a rear surface 120b of the upper plate 120 formed of steel. Furthermore, in the embodiment, since the card 1 is formed by multiple patterns (see FIG. 3), the masking tape 125 adheres to a plurality of portions respectively corresponding to the cards 1.

(2) An uneven portion is provided in both surfaces of the upper plate 120 by blasting such as bead blasting. The size of a bead 128 used for bead blasting corresponds to the surface roughness of the transition portion 23. Furthermore, the reason why bead blasting is performed on both surfaces of the upper plate 120 is because the warped state caused by work hardening needs to be prevented.

(3) As illustrated in FIG. 2B, the masking tape 125 is peeled off, and a new masking tape 126 adheres thereto as in the state (1). The adhesion range of the masking tape 126 is a range corresponding to the mirror-surface portion 21 and the transition portion 23, that is, a range corresponding to the range inside the matte portion 22.

(4) Bead blasting is performed on the upper plate 120 as in the state (2). The size of the bead used for bead blasting corresponds to the surface roughness of the matte portion 22. That is, the size of a bead 129 is larger than that of the bead 128 of the state (2).

(5) As illustrated in FIG. 3C, the masking tape 126 is peeled off.

With the above-described process, it is possible to form the rear surface 120b of the upper plate 120 of the die that shapes the front surface of the surface layer 20 (see FIG. 3A).

As illustrated in FIG. 3C, a mirror-surface portion corresponding portion 121, a matte portion corresponding portion 122, and a transition portion corresponding portion 123 are provided on the rear surface 120b of the manufactured upper plate 120.

Since the mirror-surface portion corresponding portion 121 is normally subjected to masking, the mirror-surface portion corresponding portion 121 is formed in a mirror-surface shape without an uneven portion corresponding to the mirror-surface portion 21. The mirror-surface portion corresponding portion 121 is provided at a position corresponding to the mirror-surface portion 21 of the surface layer 20.

The matte portion corresponding portion 122 is provided at a portion outside the mirror-surface portion corresponding portion 121. The matte portion corresponding portion 122 includes more uneven portions than those of the mirror-surface portion 21 and is provided in a matte shape corresponding to the matte portion 22. The matte portion corresponding portion 122 is provided at a position corresponding to the matte portion 22 of the surface layer 20.

The transition portion corresponding portion 123 is provided in a range located on the entire outer circumference of the mirror-surface portion corresponding portion 121 and inside the matte portion corresponding portion 122. The transition portion corresponding portion 123 has a coarser grain than that of the mirror-surface portion corresponding portion 121 due to the many uneven portions provided in the transition portion corresponding portion, has a finer grain than that of the matte portion corresponding portion 122, and is formed in a matte shape corresponding to the transition portion 23. The transition portion corresponding portion 123 is provided at the position corresponding to the transition portion 23 of the surface layer 20.

Next, a method of manufacturing the card 1 will be described.

Figure 4A:
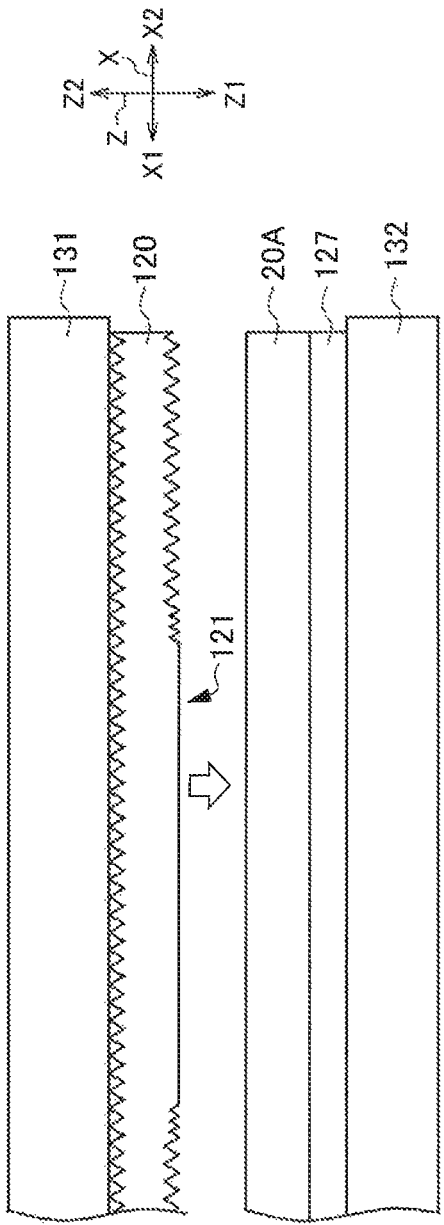
FIG. 4A and FIG. 4B are each a cross-sectional view illustrating a method of manufacturing the card 1 of the embodiment.
Figure 4B:
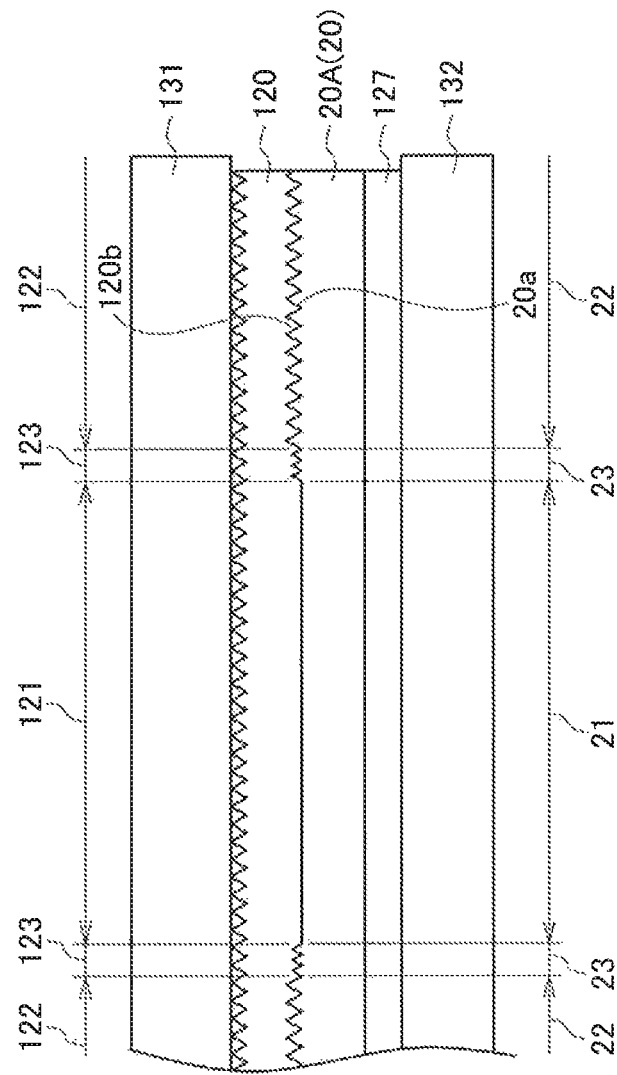

FIGS. 4 and 5 are cross-sectional views illustrating a method of manufacturing the card 1 of the embodiment.

A process of manufacturing the card 1 is performed according to the following procedure.

(Surface Layer Manufacturing Step)

(1) As illustrated in FIG. 4A, the upper plate 120 is fixed to a vertical movement portion 131 at the upside Z2 of the pressing machine. Furthermore, a lower plate 127 having a mirror surface is fixed to a fixation portion 132 at the downside Z1 of the pressing machine.

(2) A sheet member 20A that is processed in the surface layer 20 is disposed on the lower plate 127. Furthermore, a necessary printing process is already performed on the sheet member 20A. In the case when the sheet member 20A is disposed on the lower plate 127, the mirror-surface portion corresponding portion 121 and a portion to be processed in the mirror-surface portion 21 of the surface layer 20, that is, a portion not to be subjected to the printing process are positioned. For example, the positioning operation may be performed in the state when the lower plate 127 is provided with a positioning pin and the sheet member 20A is provided with a positioning hole.

(3) As illustrated in FIG. 4C, the sheet member 20A is pressed while being interposed between the upper plate 120 and the lower plate 127, and the shape of the rear surface 120b of the upper plate 120 is formed in the surface of the sheet member 20A, thereby forming the surface layer 20.

Figure 5C:
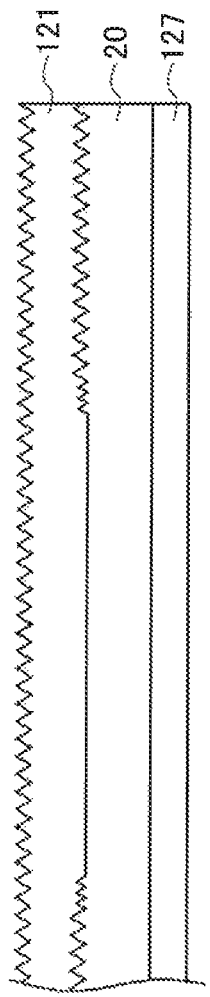
FIG. 5C to FIG. 5F are each a cross-sectional view illustrating a method of manufacturing the card 1 of the embodiment.

(4) As illustrated in FIG. 5C, the upper plate 120 and the lower plate 127 with the surface layer 20 interposed between them are separated from the pressing machine.

Figure 5D:
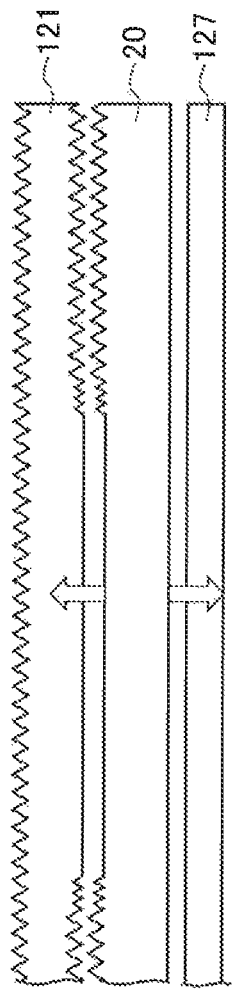

(5) As illustrated in FIG. 5D, the surface layer 20 is separated from the upper plate 120 and the lower plate 127.

With the above-described process, the multi-face surface layer 20 is manufactured as illustrated in FIG. 3B. The surface layer 20 is provided with the mirror-surface portion 21, the matte portion 22, and the transition portion 23. Furthermore, in the case when a print layer is formed on the surface of the surface layer 20, these portions are formed on the print layer.

(Display Portion Disposing Step)

Figure 5E:
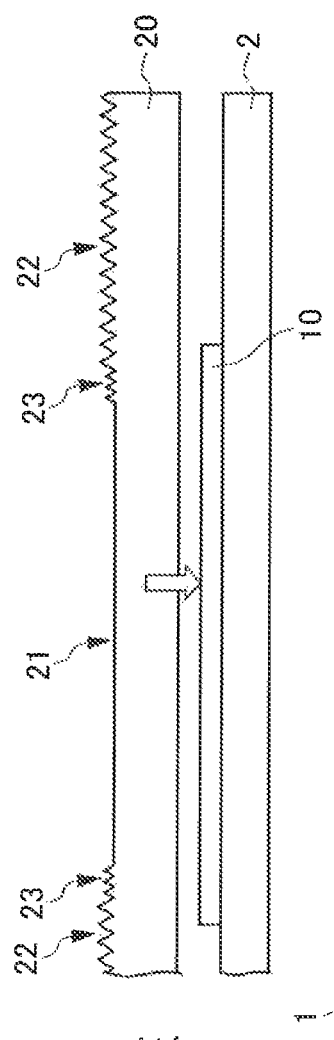

As illustrated in FIG. 5E, the display portion 10 is disposed on the card substrate 2. In this embodiment, since the card 1 is formed by multiple patterns, the display portions 10 are disposed on the card substrate 2 as many as the number of the patterns.

(IC Chip Disposing Step)

The IC chip 3 is disposed and mounted on the card substrate 2.

Furthermore, a process of manufacturing the card 1 additionally includes a step of disposing a component other than the display portion 10 and the IC chip 3 on the card substrate 2. Such a step may be simultaneously performed together with the display portion disposing step or the IC chip disposing step.

(Sheet Member Laminating Step)

Figure 5F:
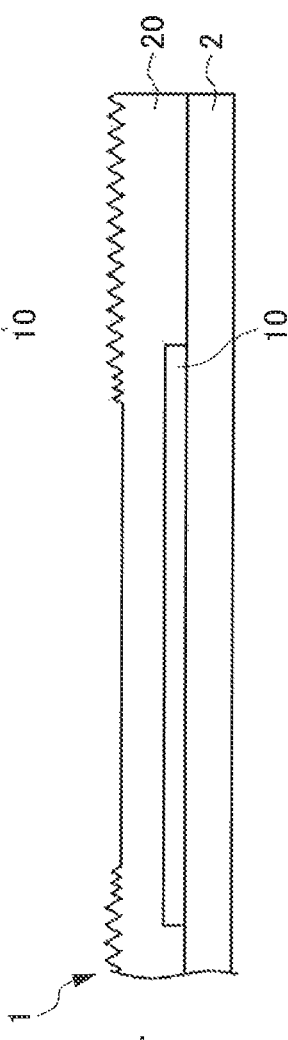

As illustrated in FIGS. 5E and 5F, the surface layer 20 that is manufactured by the surface layer manufacturing step is laminated on the card substrate 2 in which the display portion 10 is disposed by the display portion disposing step while the mirror-surface portion 21 and the display portion 10 are positioned and pressurized.

The surface layer 20 and the card substrate 2 are bonded to each other by applying an adhesive between the surface layer 20 and the card substrate 2.

As described above, the position drift between the display portion 10 and the mirror-surface portion 21 (that is, the surface layer 20) may be allowed to be about 1 mm. For this reason, the position drift allowance of the display portion 10 may be increased, and hence workability may be improved.

Furthermore, if the mirror-surface portion 21, the matte portion 22, and the transition portion 23 are provided simultaneously when the sheet member 20A is laminated on the card substrate 2 (the sheet member laminating step) as not in the case of the embodiment, the pressing pressure increases, and hence there is the possibility that the component inside the card 1 may be damaged.

On the contrary, in this embodiment, since the mirror-surface portion 21, the matte portion 22, and the transition portion 23 are provided on the sheet member 20A and the sheet member is laminated on the card substrate 2, the pressure necessary for the lamination may be decreased. For this reason, in the embodiment, since the pressure applied to the component inside the card 1 may be decreased, the damage of the component inside the card 1 may be suppressed.

(Punching Step)

The multi-face card 1 is divided into separate pieces by punching.

With the above-described process, the card 1 may be manufactured.

As described above, in the card 1 of the embodiment, the display of the display portion 10 may be clearly and visually recognized from the mirror-surface portion 21, and the texture may be improved by making scratches on the card surface 1*a* inconspicuous by the matte portion 22.

Furthermore, since the card 1 includes the transition portion 23, the boundary between the mirror-surface portion 21 and the matte portion 22 becomes unclear, and hence the texture may be further improved. In addition, the card 1 may have improved texture by eliminating the position drift between the display portion 10 and the mirror-surface portion 21, and hence the manufacturing workability may be improved.

Moreover, in the method of manufacturing the card 1 of the embodiment, the pressure applied to the component inside the card 1 may be decreased, and damage to the component inside the card 1 may be suppressed.

While the embodiment of the present invention has been described, the present invention is not limited to the above-described embodiment, and may be modified into various forms like the following modified example. Then, the modified example is included in the technical scope of the present invention. Furthermore, the effect of the embodiment is merely the preferred effect obtained from the present invention, and the effect of the present invention is not limited to the effect described in the embodiment. Furthermore, the above-described embodiment and the following modified example may be used while being appropriately combined with each other, but the detailed description thereof will be omitted.

MODIFIED EXAMPLE (1) In this embodiment, an example has been described in which the transition portion has a uniform matte shape, but the present invention is not limited thereto. For example, in the transition portion, the uneven portion may be changed gradually or gently.

(2) In this embodiment, an example has been described in which the mirror-surface portion is provided at a position corresponding to the display portion, but the present invention is not limited thereto. For example, in the case when a display portion such as an identification photo is provided inside the card, the mirror-surface portion may be provided at a position where the identification photo or the like is disposed. In this case, the identification photo or the like may be clearly and visually recognized. Furthermore, for example, the mirror-surface portion may be provided in an area where the hologram label or the like adheres. In this case, since air biting may be prevented in the case when the hologram label adheres, the card manufacturing workability may be improved.

The invention claimed is:

1. A card comprising:
a display portion;
an electronic component that causes the display portion to display; and
a surface layer that is disposed on a topmost layer of the card and is formed of a transparent material,
wherein when a front surface of the card is viewed from a normal direction, the surface layer includes
a mirror-surface portion that is provided in a portion overlapping the display portion, and
a matte portion that is provided in a portion outside the mirror-surface portion and has an average roughness greater than that of the mirror-surface portion, and
wherein the mirror-surface portion and the matte portion are provided at an outermost surface of the surface layer.

2. The card according to claim 1,
wherein the surface layer further includes a transition portion that is provided in a range located outside an entire circumference of the mirror-surface portion and inside the matte portion when the front surface of the card is viewed from the normal direction, the transition portion having an average roughness which is greater than that of the mirror-surface portion and smaller than that of the matte portion.

3. The card according to claim 2,
wherein the electronic component includes a button that is operable by a user and through which an instruction is entered by the user to cause the display portion to display information.

4. The card according to claim 1,
wherein the electronic component includes a button that is operable by a user and through which an instruction is entered by the user to cause the display portion to display information.

5. A method of manufacturing the card according to claim 1, the card comprising:
a display portion;
an electronic component that causes the display portion to display; and
a surface layer that is disposed on a topmost layer of the card and is formed of a transparent material,
wherein when a front surface of the card is viewed from a normal direction, the surface layer includes
a mirror-surface portion that is provided in a portion overlapping the display portion, and
a matte portion that is provided in a portion outside the mirror-surface portion and has an average roughness greater than that of the mirror-surface portion, and
wherein the mirror-surface portion and the matte portion are provided at an outermost surface of the surface layer;
comprising the steps of:
manufacturing the surface layer with the mirror-surface portion and the matte portion by pressing a die which includes a first portion corresponding to the mirror-surface portion and a second portion corresponding to the matte portion against a sheet member, the second portion being provided in a portion outside the first portion and having an average roughness greater than that of the first portion;
disposing the display portion onto a card substrate; and
laminating the surface layer manufactured in the manufacturing step onto the card substrate disposed in the disposing step while aligning the mirror-surface portion with the display portion.

6. The method of manufacturing the card according to claim 5,
wherein the die includes a third portion corresponding to a transition portion that is provided in a range located outside an entire circumference of the mirror-surface portion and inside the matte portion and has an average roughness greater than that of the mirror-surface portion and smaller than that of the matte portion, wherein the third portion is provided in a range located outside an entire circumference of the first portion and inside the second portion and has an average roughness greater than that of the first portion and smaller than that of the second portion, and wherein the die is pressed against the sheet member so as to form the transition portion in the surface layer manufacturing step.

7. The method of manufacturing the card according to claim 6, wherein the electronic component includes a button that is operable by a user and through which an instruction is entered by the user to cause the display portion to display information.

8. The method of manufacturing the card according to claim 5, wherein the electronic component includes a button that is operable by a user and through which an instruction is entered by the user to cause the display portion to display information.

* * * * *